United States Patent
Hirose et al.

(10) Patent No.: US 8,706,775 B2
(45) Date of Patent: Apr. 22, 2014

(54) EDITING DEVICE AND EDITING METHOD USING METADATA

(75) Inventors: Takumi Hirose, Kobe (JP); Toshifumi Egusa, Kobe (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 213 days.

(21) Appl. No.: 12/311,917

(22) PCT Filed: Oct. 30, 2006

(86) PCT No.: PCT/JP2006/321641
§ 371 (c)(1),
(2), (4) Date: Apr. 17, 2009

(87) PCT Pub. No.: WO2008/053515
PCT Pub. Date: May 8, 2008

(65) Prior Publication Data
US 2010/0023540 A1    Jan. 28, 2010

(51) Int. Cl.
*G06F 7/00* (2006.01)
*G06F 17/30* (2006.01)

(52) U.S. Cl.
USPC ........... 707/804; 707/805; 707/736; 707/758; 386/278; 386/326; 715/723; 715/732

(58) Field of Classification Search
None
See application file for complete search history.

(56) References Cited

U.S. PATENT DOCUMENTS

| | | | |
|---|---|---|---|
| 7,450,773 B2 * | 11/2008 | Nomizu et al. | 382/244 |
| 7,640,569 B2 * | 12/2009 | Kitajima | 725/115 |
| 2005/0008328 A1 * | 1/2005 | Kawa et al. | 386/52 |
| 2006/0101065 A1 * | 5/2006 | Tsutsui et al. | 707/102 |
| 2006/0206461 A1 | 9/2006 | Tsuchiya et al. | |
| 2009/0055744 A1 * | 2/2009 | Sawada et al. | 715/719 |
| 2009/0172197 A1 * | 7/2009 | Kalaboukis et al. | 709/246 |
| 2010/0023540 A1 | 1/2010 | Hirose et al. | |

FOREIGN PATENT DOCUMENTS

| | | |
|---|---|---|
| JP | 11/136631 | 5/1999 |
| JP | 11136631 A | 5/1999 |
| JP | 2000-173246 | 6/2000 |
| JP | 2000173246 A | 6/2000 |
| JP | 2006/254372 | 9/2006 |
| JP | 2006254372 A | 9/2006 |
| WO | 2004084214 | 9/2004 |

OTHER PUBLICATIONS

Search Report Dated Jan. 24, 2007.
Abstract of JP 2000173246 dated Jun. 23, 2000.
Abstract of JP 2006254372 dated Sep. 21, 2006.
Abstract of JP 11136631 dated May 21, 1999.
Notice of Reason for Rejection in Japanese Application No. 2008-541929 dispatched Jul. 24, 2012.

* cited by examiner

*Primary Examiner* — Sherief Badawi
*Assistant Examiner* — Loan T Nguyen
(74) *Attorney, Agent, or Firm* — Arent Fox LLP

(57) ABSTRACT

A waiting time until editing starts is shortened. Metadata that are a part of metadata are transferred from an optical disc set in a disc unit to an HDD in an editing device. The metadata are text data including a clip ID and continuing time information of material data, and they are small in information quantity. Thus, a waiting time for waiting for the completion of metadata transfer does not take place, and immediately after the optical disc is set editing processing can start. An editor selects a clip in accordance with a clip ID included in the metadata. Further, the editor selects a used portion of the clip in accordance with the continuing time information included in the metadata. Editing data are generated on the basis of these selected results.

10 Claims, 12 Drawing Sheets

```xml
- <CLIP NAME="Clip1" START_TIMECODE="00:00:00:00" DURATION_IN_FRAMES="60" VERSION="2.1">
  - <DESCRIPTIVEMETADATA>
      <OrganizationName>Grass Valley</OrganizationName>
      <CreationTime>2006-10-17T03:06:00</CreationTime>
      <LastModified>2006-10-17T03:06:00</LastModified>
      <OperatorName>Testing crew</OperatorName>
      <DeviceID>Device 10</DeviceID>
    </DESCRIPTIVEMETADATA>
  - <CODECPROPERTIES>
      <Fps>FPS_5994</Fps>
      <TimeCode>Drop</TimeCode>
      <FileFormat>MXF_OP1A</FileFormat>
    - <Video>
        <VideoMode>1080i5994</VideoMode>
        <CompressionType>MPEG2</CompressionType>
        <Size>1440x1080</Size>
        <AspectRatio>16:9</AspectRatio>
        <ChromaSubsampling>4:2:0</ChromaSubsampling>
      </Video>
    - <Audio>
        <NumChannels>4</NumChannels>
        <BitsPerSample>24</BitsPerSample>
        <SamplesPerSecond>48000</SamplesPerSecond>
      </Audio>
    </CODECPROPERTIES>
  - <MEDIA NumOfChunks="1">
      <Chunk DURATION_IN_FRAMES="60" ASSET_ID="Clip1.mxf" />
    </MEDIA>
  </CLIP>
```

EDITING DATA

| CONTENT TIME INFORMATION | CLIP ID | MATERIAL TIME INFORMATION |
|---|---|---|
| T1~T7 | Clip35 | t3~t9 |
| T2~T22 | Clip30 | t1~t21 |
| T23~T30 | Clip37 | t1~t8 |
| T31~T40 | Clip39 | t9~t18 |
| T41~T55 | Clip41 | t4~t18 |
| T55~T75 | Clip42 | t5~t25 |
| T76~T89 | Clip49 | t4~t17 |
| T90~T100 | Clip51 | t1~t11 |
| ... | ... | ... |

FIG. 7

|  | IN THE MIDDLE OF ACQUISITION | ACQUIRED |
|---|---|---|
| ONLY METADATA | — — — | STS1 |
| PROXY DATA | STS2 | STS3 |
| ORIGINAL DATA | STS4 | STS5 |

FIG. 8

EDITING DEVICE AND EDITING METHOD USING METADATA

This application claims the benefit, under 35 U.S.C. §365 of International Application PCT/JP2006/321641, filed Oct. 30, 2006, which was published in accordance with PCT Article 21(2) on May 8, 2008 in Japanese.

TECHNICAL FIELD

The present invention relates to an information processing technique that makes it possible to start editing of contents immediately.

BACKGROUND ART

In recent years, randomly accessible, and high density removable media have become popular as a recording medium used in a video camera for broadcasting operation. Such a removable media includes, for example, an optical disk, a magneto optical disk, a magnetic disk, and a semiconductor memory or the like. The recorded video data and audio data are stored in an internal or external disk drive used with an editing apparatus, and transmitted to a hard disk drive (HDD) or the like for editing.

In the case of recording the video data and the audio data in the randomly accessible recording medium, these items of data are managed as a set of files (hereinafter referred to as the "clip"). For example, one clip is associated with main data file such as image data or audio data, a proxy data file, and a metadata file. The "main data" herein means video data and audio data as material of actual broadcasting data, and the main data is not compressed, or compressed at a relatively low compression ratio. The "proxy data" is compressed at a compression ratio that is higher than that for the main data. The "metadata" is information used for management of, e.g., reproduction of the main data file or the proxy data file.

In an actual shooting site or the like, editing is performed using proxy data as material to create broadcasting content data. For example, according to the disclosure of Patent documents 1, 2, an optical disk containing the recorded data is taken out from a video camera, and mounted in an optical disk drive. The proxy data is copied to a HDD in the optical disk drive for editing. Based on the edited proxy data, the main data is edited, and the final broadcasting content data is created.

Patent document 1: Japanese Laid-Open Patent Publication No. 2004-343217
Patent document 2: Japanese Laid-Open Patent Publication No. 2004-343218

DISCLOSURE OF THE INVENTION

In the case of editing the proxy data as material data, in comparison with the case of using the main data, the amount of data transmitted from a removable medium to editing storage means such as a hard disk drive is small. As a result of the increase in the capacity of the recording medium (in particular, removable medium), and the demand for high resolution video, the amount of the proxy data as well as the main data tends to increase.

However, in general, the speed of reading data from a removal medium such as an optical disk or a magneto optical disk is low. Under the circumstances, it takes considerable time to transmit proxy data from storage means which is accessed at a low speed to editing storage means.

In order to increase the speed of transmitting the proxy data from a recording medium to editing storage means, it is contemplated that the proxy data is read from storage means which is accessed at a high speed and is a magnetic disk or a semiconductor memory. For example, in the case where the proxy data is read from a magnetic disk or a semiconductor memory in the video camera, the video camera is connected to the editing apparatus, and the proxy data is transmitted from the video camera to the editing apparatus. However, since the video camera does not have any communication means which achieves the sufficient communication speed, in general, it takes considerable time for transmission of the proxy data.

Consequently, it takes considerable time for transmitting the proxy data from the recording medium storing the proxy data to the storage means for editing, and wait time is required to start editing operation. In particular, at present, as a result of the increase in the amount of data along with the increase in the resolution, the storage capacity of the removable medium has been increased. Therefore, the wait time to start editing operation is getting longer. The demand for immediately starting editing operation at the broadcasting shooing site is not satisfied.

The present invention has been made to solve the above problems, and an object of the present invention is to provide a technique that makes it possible to start editing immediately.

The inventors of the present application focused on the fact that, in the shooting site adopting non-linear editing, at the time of shooting, material data that can be used as actual broadcasting content data and material data that cannot be used as actual broadcasting content data are identified by the shooter. At the time of shooting, the shooter records material identifiers for identifying the usable material data, and time information indicating usable portion of the material data, and passes these items of data to the editor. Therefore, in most cases, at the time of editing, the editor knows the material identifier of material data which is likely to be used as content data, and the usable portion of the material data. In view of above, the inventors conceived a system of editing material data based only on the material data identifiers and time information.

That is, the present invention 1 provides an editing apparatus comprising:
a metadata acquisition unit for acquiring metadata regarding material data from a recording medium;
a user interface unit for selecting at least part of the material data by using the metadata; and
an editing unit for generating editing data according to the selection.

The editor operating the editing apparatus edits the material data to form the video content or audio content by using the metadata. In general, the metadata is part of, or all of metadata as annex information used for managing the material data, and the metadata is in a text format. The material data is the proxy data or the main data of video or audio. It is sufficient to transmit the metadata from the optical disk before editing. Transmission of the material data is not essential. Since the metadata is small in terms of the amount of information, in comparison with the material data, transmission of the metadata can be made instantly. Therefore, after the optical disk is inserted in the drive, and reading of data from the optical disk is started, the editor can start editing operation immediately.

The invention 2 is based on the invention 1, and provides an editing apparatus in which the metadata acquisition unit acquires the metadata including a material identifier for identifying the material data and time length information indicating the duration of the material data from the recording medium, and writes the metadata in editing storage means. The user interface unit comprises:

a display control unit for generating display data used to display the material identifier and the time length information included in the metadata acquired by the metadata acquisition unit such that the material identifier and the time length information are associated with each other in the display; and a designation reception unit for receiving designation of material data forming content based on the display data.

In the editing apparatus, the editing unit generates the editing data based on the designation of material data forming content.

For example, in the case where the material data and the metadata are recorded in an optical disk, the material identifier and the time length information in the metadata are read, and displayed on a display by the editing apparatus. Based on the material identifier, the editor designates material data. Further, the editor designates portion of the material data to be used and a time position along the time axis of the content. In this manner, without using material data, it is possible to designate material data forming content only by using the material identifier and the time information regarding the material data.

The invention 3 is based on the invention 2, and provides an editing apparatus further comprising a determination unit. The determination unit determines whether the material data is stored in the editing storage means or not. In the apparatus, based on the determination result by the determination unit, the display control unit generates display data used to further associate a predetermined dummy image with the material identifier and the time length information.

By displaying the dummy image, the editor can recognize that the material data is not present in the editing apparatus at a glance.

In the case where the material data is stored in the editing storage means such as a hard disk drive (HDD) which can be accessed at a high speed, the editing apparatus may display the material data in a conventional manner, for allowing the editor to edit the data, while checking the image. The speed of accessing the material data in the HDD is significantly higher than the speed of accessing the data in the external recording medium. Therefore, even in the shooting site or the editing site where swiftness is required, the wait time required to display the material data is not considerably long.

The invention 4 is based on the invention 2, and provides an editing apparatus in which the designation reception unit further receives a setting as to whether the material data is acquired from the recording medium. The editing apparatus further comprises a material acquisition unit. The display control unit generates display data used to further associate the material data acquired by the material acquisition unit with the metadata. Based on the setting, the material acquisition unit acquires material data from the recording medium and writes the acquired material data in the editing storage means.

In some cases, it is possible to finish editing only by using the metadata. Further, in some cases, it is desirable to use the material data for editing. Therefore, the setting as to whether the material data is required or not is received to prevent acquisition of unnecessary material data. In this manner, it is possible to avoid the wait time for acquiring the unnecessary material data, and it is possible to prevent the increase in the load on the editing apparatus.

The invention 5 is based on the invention 4, and provides an editing apparatus in which the designation reception unit further receives a setting as to the type of material data to be acquired.

The acquisition setting may include the setting as to the type of material data to be acquired. For example, the type of material data includes the main data and the proxy data. By making it possible to selectively acquire data needed for editing, the wait time required for the editor to start editing is reduced, and improvement in the convenience for editing is achieved.

The invention 6 is based on the invention 4, and provides an editing apparatus in which the display control unit generates display data used to further associate a state of the material data acquired by, or being acquired by the material acquisition unit with the metadata.

For example, the displayed state includes the type of material data, the acquisition state of material data, and the acquisition percentage of material data. As described above, for example, the type of material data includes the main data and the proxy data. For example, the state of acquisition may be (1) "acquired", (2) "in the middle of acquisition", or (3) "not acquired" (in the case of metadata only). The acquisition percentage means the percentage of acquired data in the amount of all of the files of the material data.

The invention 7 is based on the invention 1, and provides an editing apparatus in which the metadata acquisition unit acquires the metadata including a material identifier for identifying the material data and time length information indicating the duration of the material data from the recording medium, and writes the metadata in editing storage means. In the apparatus, the user interface unit generates display data used to display the material identifier and the time length information included in the metadata acquired by the metadata acquisition unit such that the material identifier and the time length information are associated with each other in the display, and receives the selection based on the generated display data. Further, the editing unit generates the editing data before the material data is completely acquired from the recording medium.

Since it is possible to immediately start editing operation by using the metadata without waiting completion of acquisition of material data, the wait time required to start editing is eliminated, and improvement in the convenience for the editor is achieved.

The invention 8 is based on the invention 7, and provides an editing apparatus further comprising a material acquisition unit for acquiring the material data from the recording medium.

By acquiring only material data needed for formation of content data, it is possible to prevent acquisition of unnecessary material data.

The invention 9 provides a recording medium readable by a computer, and the recording medium stores an editing program for allowing a computer terminal to carry out:

a metadata acquisition step of acquiring metadata regarding material data from a recording medium;

a user interface step of selecting at least part of the material data by using the metadata; and an editing step of generating editing data according to the selection.

The editing program recorded in the recording medium allows the computer to function as the editing apparatus of the invention 1, and achieves the same advantages as in the case of the invention 1.

The present invention 10 provides an editing program for allowing a computer terminal to carry out:

a metadata acquisition step of acquiring metadata regarding material data from a recording medium;

a user interface step of selecting at least part of the material data by using the metadata; and an editing step of generating editing data according to the selection.

The editing program allows the computer to function as the editing apparatus of the invention 1, and achieves the same advantages as in the case of the invention 1.

The present invention 11 provides an editing method comprising:

a metadata acquisition step of acquiring metadata regarding material data from a recording medium;

a user interface step of selecting at least part of the material data by using the metadata; and an editing step of generating editing data according to the selection.

The editing method is a method carried out by the editing apparatus of the invention 1, and achieves the same advantages as in the case of the invention 1.

BRIEF DESCRIPTION OF DRAWINGS

FIG. 3 is a view showing an example of metadata written in XML (eXtensible Markup Language);

FIG. 4 is a view showing a designation screen displaying the metadata;

FIG. 7 is a view showing the concept of editing data generated by the editing apparatus in FIG. 1;

FIG. 8 is a table showing the state of material data managed by the editing apparatus in FIG. 1;

BEST MODE FOR CARRYING OUT THE INVENTION

Summary of the Invention

An editing apparatus according to the present invention can be achieved by using a normal computer terminal such as a laptop computer terminal or a desktop computer terminal. Metadata is transmitted to a hard disk drive (HDD) of the editing apparatus from a removable medium such as an optical disk mounted in an external or internal disk drive of the editing apparatus. The metadata includes a "clip ID" for identifying a clip (the clip ID corresponds to the material identifier), and "time length information" indicating the duration of the material data. Therefore, the amount of information in the metadata is small. Thus, the editor can start editing operation immediately after the optical disk is mounted without waiting completion of transmission of metadata.

Specifically, the editing operation is performed in the following manner. The editor selects the clip based on the clip ID in the metadata. Further, the editor selects portion of the material data to be used and the time position along the time axis of the content, based on the time length information in the metadata. Based on the selection result, editing data is generated by associating the clip ID, material time information and content time information. The "material time information" herein means time information designating part or all of the duration of the material data. The "content time information" means time information indicating a time position along the time axis from the start to the end of the content.

The clip including material data and metadata is recorded in a recording medium such as an optical disk. The "clip" herein means a set of data generated from the start to the end of one shooting operation by the shooter. For example, the clip includes "main data", "proxy data" and "metadata". The main data is non-compressed data such as image data or audio data, or obtained by compressing image data and audio data at a relative low compression ratio. The proxy data is obtained by compressing the main data at a high compression ratio. The metadata is information used for managing the main data and the proxy data, and does not include any material data such as image data and audio data. It should be noted that the "material data" includes the main data and the proxy data.

The "metadata" is annex information used for managing the material data. For example, the editor uses the metadata at the time of editing for confirming the content of material data and for searching a predetermined frame. For example, the metadata includes information about shooting time/date, shooting location, duration of the material data (corresponding to time length information), file size, video size, compression format, LTC (Linear Time Code), FTC (File Time Code), conversion table and memorandum information of the shooter.

First Embodiment

<<Hardware Structure of Editing Apparatus>>

Figure 1:
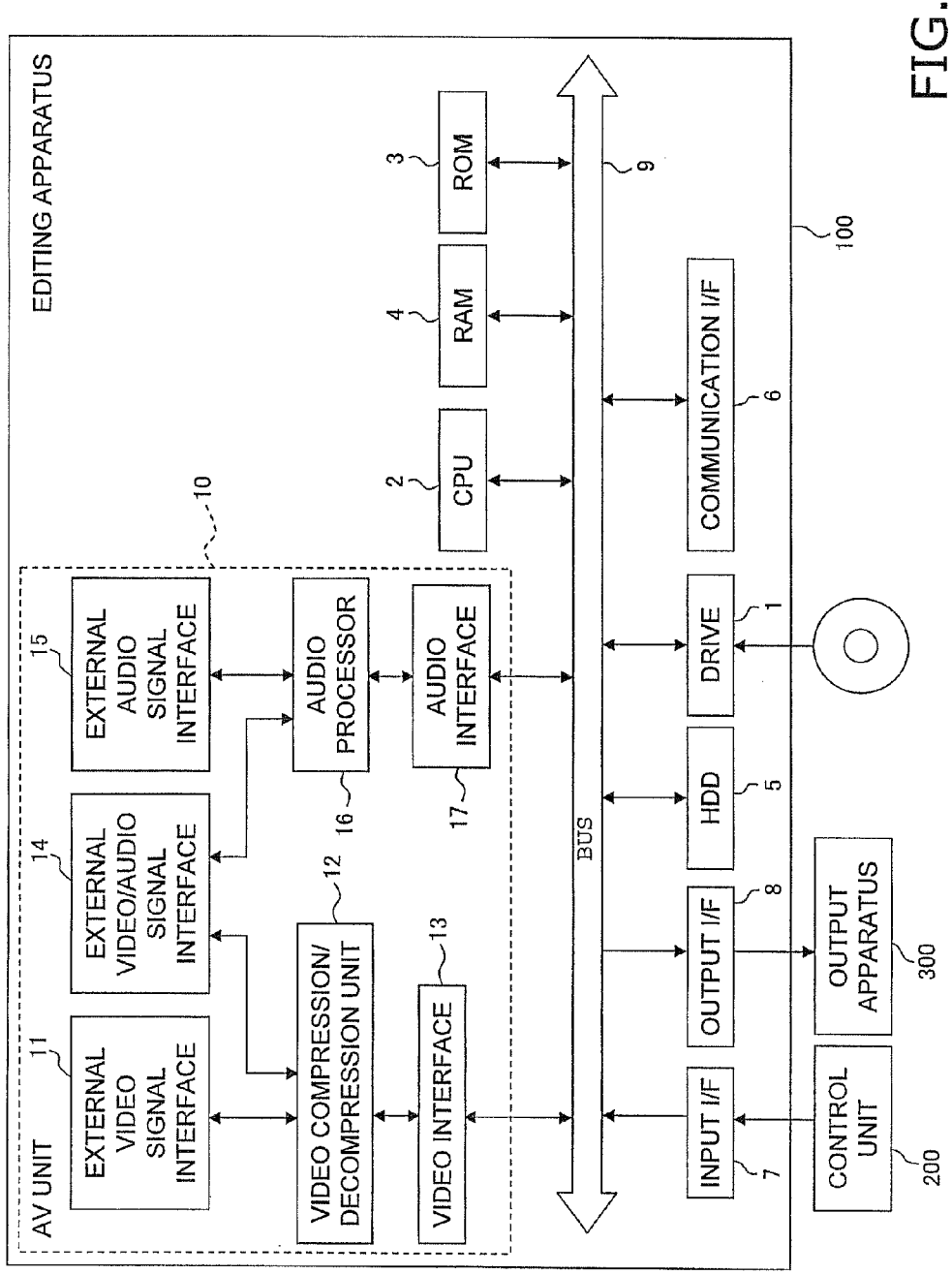
FIG. 1 is a block diagram showing hardware structure of an editing apparatus according to a first embodiment of the present invention.

FIG. 1 is a block diagram showing hardware structure of an editing apparatus 100 according to a first embodiment of the present invention. The editing apparatus 100 at least includes a drive 1, a CPU 2, a RAM 4, a ROM 3, a HDD (hard disk drive) 5, a communication interface 6, an input interface 7, an output interface 8 and a bus 9 for connecting these components to each other. The editing apparatus may further include an AV unit 10.

A removable medium (corresponding to the recording medium) such as an optical disk is mounted in the drive 1, and data is read from the removable medium. FIG. 1 shows a case in which the drive 1 is internally provided in the editing apparatus 100. Alternatively, the drive 1 may be provided externally to the editing apparatus 100. In the embodiment, though the optical disk is used as the removable medium as an example, it is possible to use a magnetic disk, a magneto optical disk, a Blu-ray disk, a semiconductor memory or the like. Further, the metadata and material data may be read from the internal drive or the external drive. Also, the metadata and material data may be read from a resource on a network that can be connected to the editing apparatus 100 through the communication interface 6.

The CPU 2 loads a control program recorded in the ROM 3 in a volatile storage area such as the RAM 4, and controls the overall operation of the editing apparatus 100. For example, when the optical disk is mounted in the drive 1, the CPU 2 controls components of the drive 1 for reading metadata recorded in the optical disk and writing the read data in the HDD 5.

The HDD 5 (corresponding to the editing storage means) stores the metadata and the material data read from the optical disk, and supplied through the bus 9. The speed of accessing the material data stored in the HDD 5 is higher than the speed of accessing data in the optical disk mounted in the disk drive 1. Therefore, even if the material data stored in the HDD 5 is displayed at the time of editing, it is likely that no delay problems occur. Although the embodiment is described in connection with an example in which the HDD 5 is used as editing storage means for writing the metadata or material data read from the optical disk, the editing storage means may be other types of storage means as long as it can be accessed at a high speed. For example, as other types of the editing storage means, it is possible to use a magnetic disk, a magneto optical disk, a Blu-ray disk, a semiconductor memory or the like which can be read from an internal disk drive or an external disk drive. Further, as the editing storage means, it is also possible to use these types of storage means on a network that can be connected to the editing apparatus 100 through the communication interface 6.

The communication interface (I/F in FIG. 1) 6 communicates with a video camera connected through a USB (Universal Serial Bus) or the like, and receives data recorded in an internal recording medium of the video camera. Further, the communication interface 6 is capable of sending editing data generated through a LAN or the Internet to a resource on the network.

The input interface (I/F in FIG. 1) 7 receives the editor's inputs to the control unit 200 such as a keyboard or a mouse, and supplies a control signal to the CPU 2 through the bus 9.

The output interface (I/F in FIG. 1) 8 supplies image data and audio data to an output apparatus 300 such as an LCD (liquid crystal display) and a speaker under the control of the CPU 2.

The AV unit 10 has elements and functions as described in the following items (a) to (g).

(a) Video signals are transmitted between the outside of the editing apparatus 100 and a video compression/decompression unit 12 through an external video signal interface 11. For example, the external video signal interface 11 includes input/output unit for analog composite signals and analog component signals.

(b) The video compression/decompression unit 12 decodes, and implements analog conversion of video data supplied through a video interface 13, and outputs the resulting data to the external video signal interface 11. Further, the video compression/decompression unit 12 compresses (encodes) the video signal supplied through the external video signal interface 11 or an external video/audio signal interface 14, e.g., in the MPEG (Moving Picture Experts Group) 2 format after digital conversion as necessary, and outputs the resulting data to the bus 9 through the video interface 13.

(c) The video interface 13 transfers data between the video compression/decompression unit 12 and the bus 9.

(d) The external video/audio signal interface 14 outputs video data and audio data inputted from a device outside the editing apparatus 100 to the video compression/decompression unit 12 and an audio processor 16, respectively. Further, the external video/audio signal interface 14 outputs video data supplied from the video compression/decompression unit 12 and audio data supplied from the audio processor 16 to the outside. For example, the external video/audio signal interface 14 is compliant with SDI (Serial Digital Interface) and SDTI (Serial Data Transfer Interface).

(e) Audio signals are transmitted between the outside of the editing apparatus 100 and the audio processor 16 through an external audio signal interface 15. For example, the external audio signal interface 15 is compliant with standards of an analog audio signal interface and AES-EBU (Audio Engineering Society-European Broadcast Union).

(f) The audio processor 16 implements analog/digital conversion of the audio signal supplied from the external audio signal interface 15, and outputs the resulting data to an audio interface 17. Further, the audio processor 16 implements, e.g., digital/analog conversion and sound adjustment of the audio data supplied from the audio interface 17, and outputs the resulting data to the external audio signal interface 15.

(g) The audio interface 17 supplies data to the audio processor 16, and outputs data from the audio processor 16 to the bus 9.

<<Software Structure of Editing Apparatus>>

Figure 2:
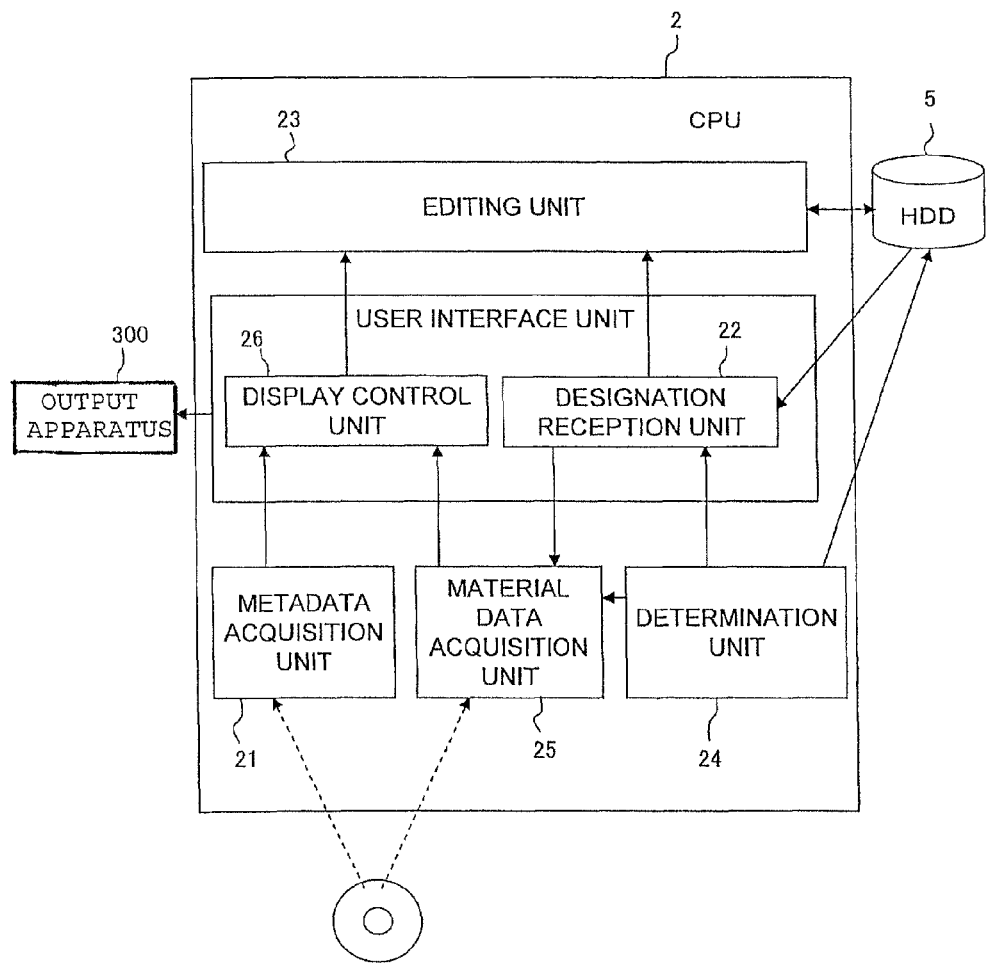
FIG. 2 is a block diagram showing functional structure of the editing apparatus shown in FIG. 1.

FIG. 2 is a block diagram showing functional structure of the editing apparatus 100. The CPU 2 of the editing apparatus 100 includes a metadata acquisition unit 21 (corresponding to the metadata acquisition unit), a designation reception unit 22 (corresponding to the designation reception unit of the user interface unit), an editing unit 23 (corresponding to the editing unit), a determination unit 24 (corresponding to the determination unit), a material data acquisition unit 25 (corresponding to the material acquisition unit) and an acquisition state display unit (corresponding to the display control unit of the user interface unit). By these components, the editing apparatus 100 achieves mainly (1) a metadata acquisition function, (2) a material data acquisition function, (3) a designation reception function, (4) an editing function, and (5) an acquisition state display function. Hereinafter, the functions of the editing apparatus 100 will be described.

(1) Metadata Acquisition Function (1-1) Acquisition of Metadata

The metadata acquisition unit 21 reads metadata of the clip selectively from a default connection destination resource or a designated connection destination resource, and writes the read data in the HDD 5. The connection destination resource herein means a recording medium storing the metadata. In the embodiment, the connection destination resource is the optical disk. The connection destination resource is not limited to the recording medium that can be mounted in the internal disk drive 1 or an external disk drive. The connection destination resource may be a recording medium on the network that can be connected to the editing apparatus 100 through the communication I/F. The metadata written in the HDD 5 is displayed on the display unit. Details about the display of the metadata will be described in the section of "(1-2) Display of metadata".

FIG. 3 is an example of metadata written in XML (eXtensible Markup Language). The format of writing the metadata is not limited to XML or other structural language. The "metadata" is part of metadata included in the clip, and includes at least a "material ID" identifying material data and "time length information" indicating the duration of the material data. The "time length information" may be information indicating the actual duration. Alternatively, the "time length information" may be combination of the recording start time information and the recording end time information of the material data. Further, the number of frames in the material data and the frame rate may be used as the "time length information". Further, alternatively, a time code of the first frame of material data and a time code of the last frame of material data may be used as the "time length information".

The time code is a frame number, and is time information indicating the time position of the frame from the start of material data.

(1-2) Display of Metadata

Figure 4:
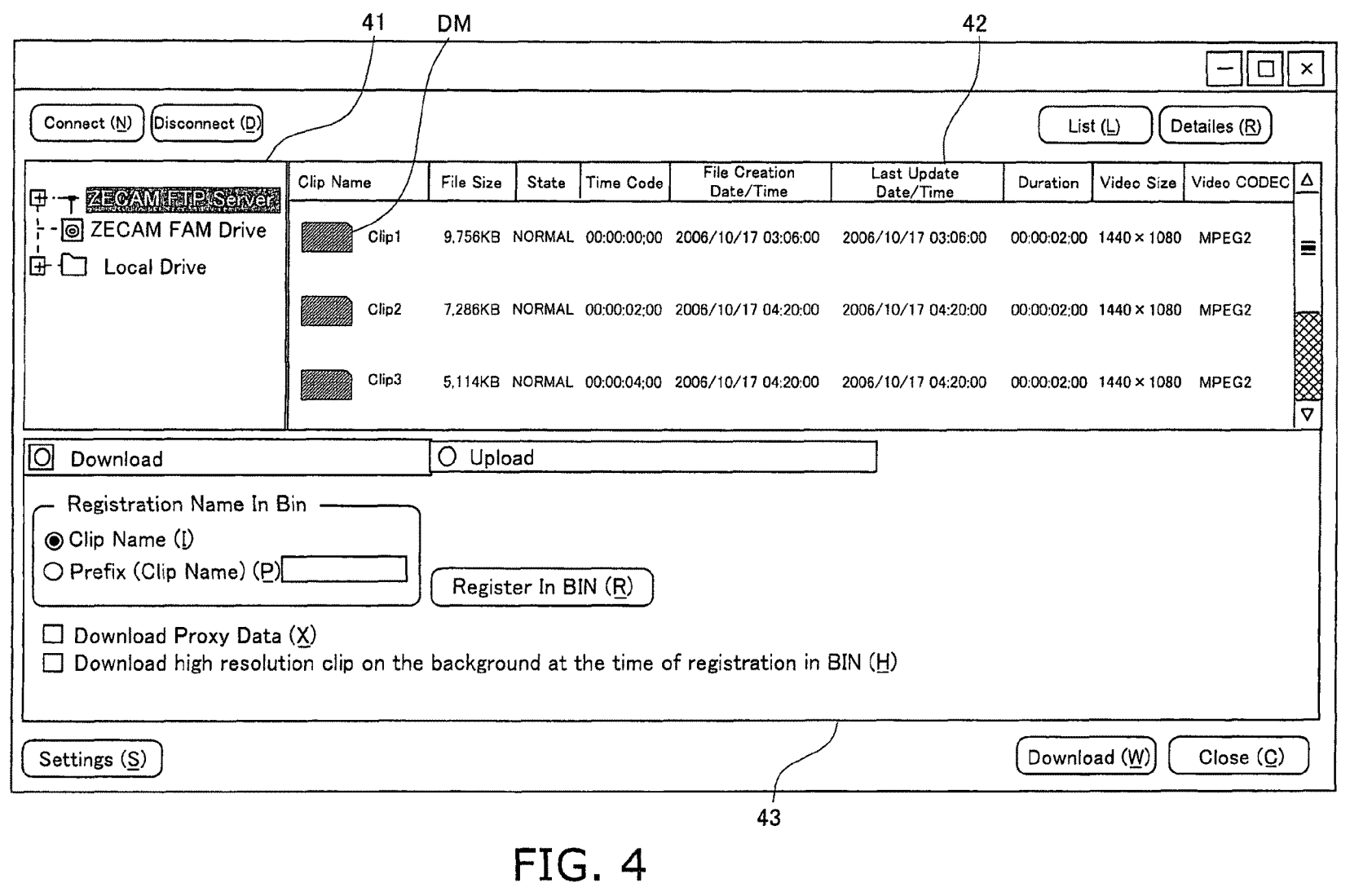

FIG. 4 shows an example of a designation screen for displaying the metadata. The display control unit 26 reads metadata recorded in the HDD 5, and generates display data of the designation screen. The generated display data is written, e.g., in a frame memory, and displayed on the output apparatus 300 such as a liquid crystal display. More specifically, the display control unit 26 receives selection on whether the metadata is transmitted to the HDD in a predetermined menu screen (not shown). If "transmit" is selected, the display data of the designation screen is generated. The designation screen includes a "connection destination designation window 41" and a "metadata window 42".

The "connection destination designation window 41" receives (accepts) designation of a connection destination resource for reading the metadata. After the connection destination resource is designated, when a "download" button at a lower position on the screen is clicked, the metadata is acquired from the designated connection destination resource into the HDD 5.

The "metadata window 42" displays the metadata in association with the clip, which metadata is downloaded from the connection destination resource to the HDD 5. In this example, "clip name", "file size", "duration", "video size" or the like are displayed in the same line as the metadata. The respective items of information included in the metadata are displayed in association with each clip in the same line on the screen. When the editor selects a clip based on the metadata, and clicks the button "resister in BIN", metadata of the selected clip is displayed on an editing screen as described later. In the drawings, "BIN" means the "clip designation window 63" in the editing screen as described later.

In FIG. 4, the "clip name" corresponds to the clip ID, and the "duration" corresponds to time length information. By displaying at least the clip ID, the editor can select a clip used for editing the content. Further, by displaying at least the duration, the editor can recognize the time length of the material data used for editing the content. Therefore, the editor can designate necessary portion of the material data by means of the time information, or designate the time position of the material data along the time axis of the content.

Figure 5:
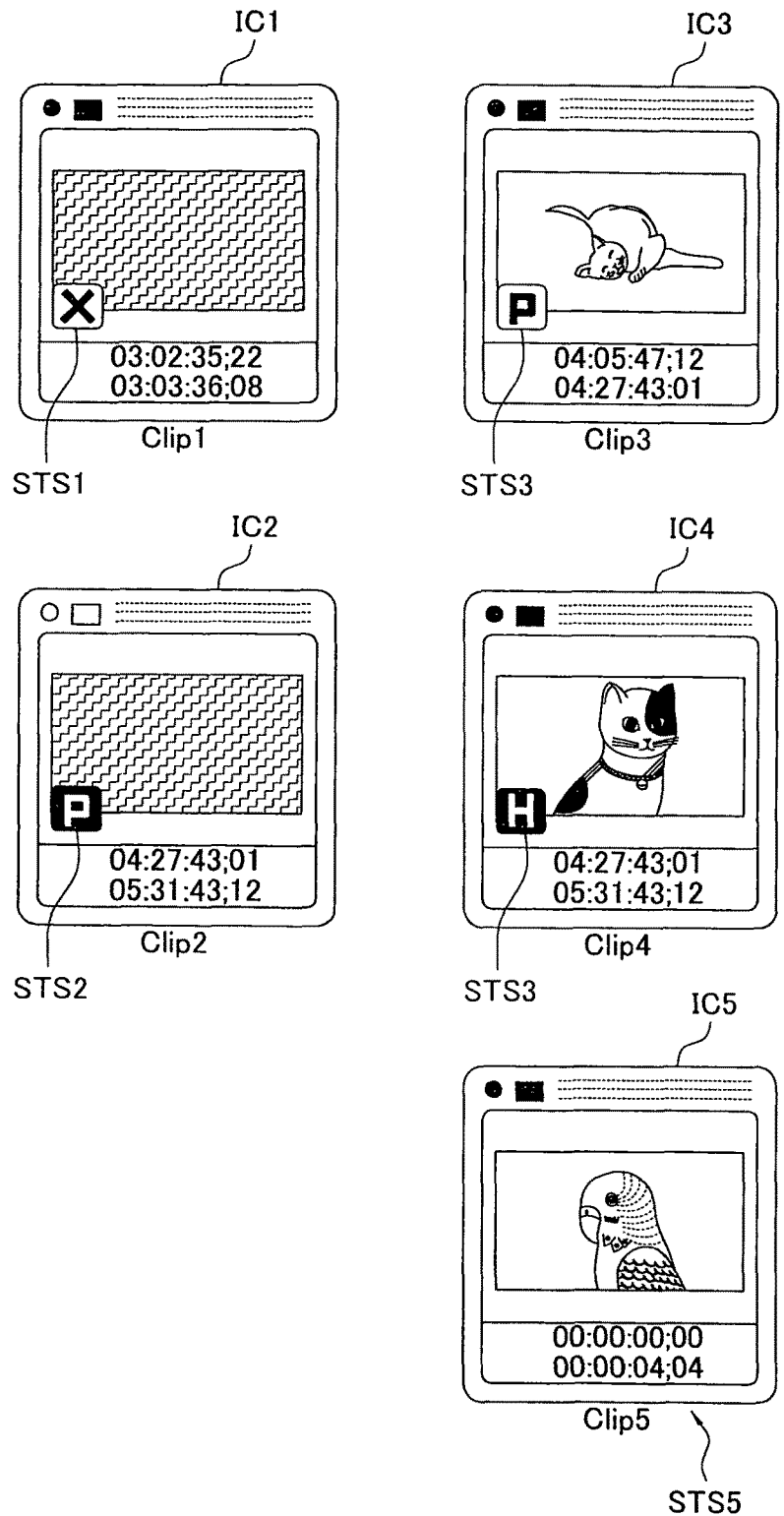
FIG. 5 is a view showing another example of displaying the metadata and a dummy image.

FIG. 5 is a view showing another example of displaying the metadata. In the example, the display control unit 26 displays window like icons IC1, IC2, IC3, IC4 and IC5 each corresponding to a clip. At a position below each icon, a clip name as the material ID is displayed. Further, in each icon, a recording start time information and a recording end time information (corresponding to the time length information) are displayed in combination.

(1-3) Display of Dummy Image

The display control unit 26 may generate a display data that associates a dummy image of the clip for which metadata has been acquired with the metadata. The dummy image is predetermined image data that does not have any special meaning. By displaying the dummy image, the editor can recognize that the material data is not recorded in the HDD 5 at a glance. Preferably, the presence of the material data in the HDD 5 is confirmed before displaying the dummy image. The presence of the material data is confirmed by the determination unit 24. If material data is stored in the HDD 5 for some reasons before downloading metadata from the optical disk, the determination unit 24 determines that the material data is stored in HDD 5.

An example of displaying the dummy image will be described with reference to FIG. 4. In the metadata window 42 in the designation screen of FIG. 4, metadata of each clip is displayed in each line. At the left ends of respective lines, predetermined dummy images DM are displayed. The dummy images DM are identical. In the example, by displaying the metadata and the dummy image DM in the same line, it can be seen that the metadata and the dummy image DM are related to each other.

FIG. 5 shows another example of displaying the dummy image. In the example, by generating a display data in which the predetermined dummy image is located in the window of the icon, the display control unit 26 can show the absence of the material data. Further, as described later, in the case where the material data is present in the HDD 5, material data may be displayed in the window of the icon. In the example, the dummy image is displayed in each of the icons IC1, IC2 to show that the material data of the clips indicated by the icons are not present in the HDD 5. It should be noted that FIG. 5 is an enlarged view showing window like icons displayed in a "clip designation window 63" in FIG. 6 as described later.

(2) Material Data Acquisition Function (2-1) Acquisition of Material Data

In accordance with the acquisition setting of material data, the material data acquisition unit 25 reads material data from a connection destination resource, and records the read material data in the HDD 5. The type of the material data to be read is in accordance with acquisition settings as described later. In the case of reading material data having a large data size such as the main data or proxy data, the material data acquisition unit 25 reads the material data such that acquisition of the metadata is completed before acquisition of the material data is completed. For example, after completion of acquisition of the metadata, the material acquisition unit 25 reads the material data on the background during editing operation. Further, for example, when the editor in the middle of editing operation based on the metadata instructs acquisition of material data, in response to the instruction, the material acquisition unit 25 reads the material data. Thus, before completion of acquisition of the material data, the editor can start editing operation by using the metadata without any wait time.

(2-2) Acquisition Settings

The designation reception unit 22 may receive a setting as to whether material data needs to be acquired, in addition to metadata. At this time, the designation reception unit 22 may additionally receive a setting regarding the type of material data. For example, the proxy data, the main data and both of them are possible choices of the "type of material data". The designation reception unit 22 stores the received acquisition settings as default values in the ROM 3, and such default values may be applied to editing of all the contents. Alternatively, the acquisition settings may be received for editing of each content. Further, the setting as to the necessity of acquiring material data may be received for each clip.

Again, with reference to the designation screen in FIG. 4, the acquisition settings will be described specifically. An "acquisition setting window 43" is displayed at a lower position of the designation screen in FIG. 4. The "acquisition setting window 43" receives settings as to the necessity of acquiring material data and the type of material data to be acquired. In the settings of FIG. 4, "material data will not be acquired". It is because none of "Download Proxy Data" and "Download high resolution clip on the background at the time of registration in BIN" is selected. When acquisition of the proxy data or the main data is selected, if the "download" button is clicked, acquisition of these items of data is started on the background of editing operation. In FIG. 4, the "high resolution clip" means the main data.

Further, in the example, the acquisition setting window 43 also receives the registration of a file name at the time of writing material data in the HDD 5. According to the settings selected in this example, the clip name included in metadata (corresponding to the clip ID) is used as the file name.

Further, a "settings" button at a lower position of the acquisition setting window 43 receives a setting as to whether the received acquisition settings are stored as default values.

(3) Designation Reception Function (3-1) Editing Screen

Figure 6:
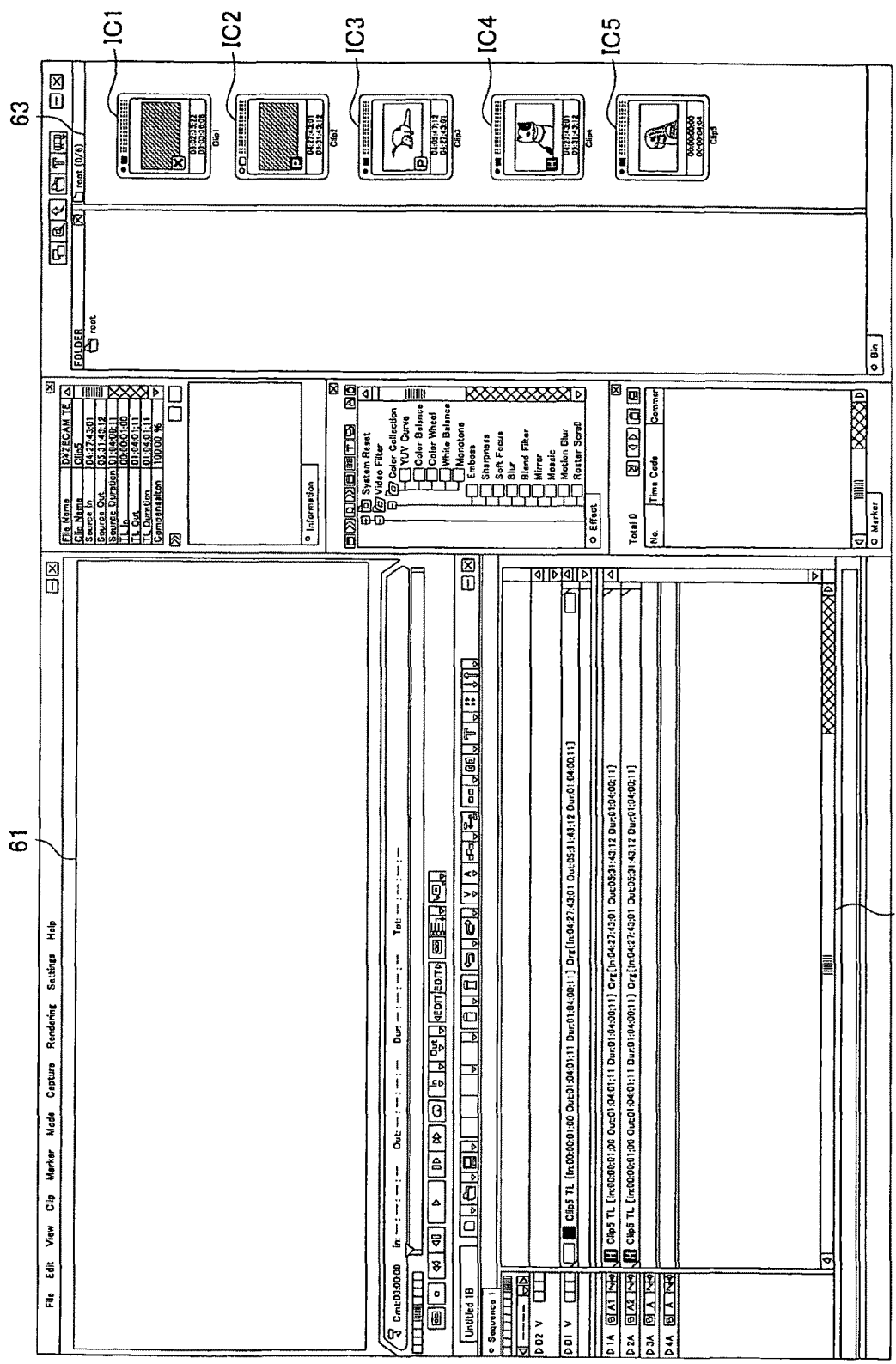
FIG. 6 is an editing screen displayed by the editing apparatus in FIG. 1.

FIG. 6 shows an example of an editing screen. The display data of the editing screen is generated by the display control unit 26. On the editing screen, the designation reception unit 22 receives designation of clips used in editing. For example, the editing screen includes the following windows. As noted above, FIG. 5 is an enlarged view showing window like icons displayed in the clip designation window 63 in FIG. 6.

(i) Reproduction window 61: The reproduction window 61 displays a dummy image or reproduced material data.

(ii) Time line display window 62: The time line display window 62 displays an image time line and an audio time line indicating positional information of image content and audio content along the time axis respectively. On each time line, a track having the length corresponding to the duration of material data is formed. The window 62 displays a time axis gauge together with the time line. The change of the track is received (accepted) on the time line. Pieces of material data indicated by respective tracks sequentially formed on the time line are part of content data.

(iii) Clip designation window 63: The clip designation window 63 displays metadata selected in the metadata window 42 in FIG. 4 in association with each clip.

(3-2) Reception of Clip Designation

On the editing screen, the designation reception unit 22 receives designation regarding the clip used in editing, portion of the material data to be used and the time position of the portion to be used along the time axis of the content. More specifically, the designation reception unit 22 receives designation regarding the "clip ID", the "material time information" and the "content time information", based on the metadata.

Reception of designation of the clip ID is carried out in the following manner. The editor drags and drops an icon of a desired clip on a time line with reference to displayed clip names. The designation reception unit 22 receives designation of clip ID by this operation. In response to this designation, a track having the length corresponding to the duration of material data of the selected clip is displayed on the time line.

Reception of designation of material time information is carried out in the following manner. The editor selects portion of the track to be used on the time line with reference to the displayed time length information. For example, if the time length information indicates that the duration of material data is 5 minutes, and the editor knows that the initial one minute should be cut beforehand, the editor selects portion of the track corresponding to the period after the initial one minute until the end. The designation reception unit 22 determines the start time position and the end time position of portion of material data used as content, i.e., determines the material time information.

Designation of the content time information is received in the following manner. With reference to the time axis gauge, the editor adjusts the position of the track on the time line. The designation reception unit 22 determines the start time position and the end time position of the clip along the time axis of the content, i.e., determines the content time information.

As described above, designation of the clip used in editing is received based on the clip ID included in metadata and the time length information of material data. Therefore, it is possible to start reception of the clip designation without waiting reading of material data.

(4) Editing

FIG. 7 is a view showing the concept of editing data generated by the editing unit 23. The editing unit 23 generates editing data associating the clip ID, the material time information and the content time information with each other, which items are designated on the editing screen. For example, the editing data includes the clip ID, the material time information and the content time information in one record for associating these items each other. Each time a new clip ID, and the corresponding material time information and content time information are designated on the editing screen, the editing unit 23 associates these items each other and newly adds these items to an entry of the editing data. Further, when the material time information and the content time information are updated on the editing screen, the editing unit 23 changes data of these items in the editing data. Until completion of the editing operation, the editing unit 23 repeatedly updates the editing data to generate an editing data file. The generated editing data is written in an arbitrary recording medium such as the HDD 5 or a removable disk attached to the external disk drive. The editing unit 23 can send the generated data to a database or an information terminal connected to the editing apparatus 100 through the communication I/F. Further, the editing unit 23 can generate content data by editing the material data based on the generated editing data, and output the generated content data through the output apparatus 300 or the AV unit 10.

(5) Acquisition State Display Function

FIG. 8 is a view showing the state of material data managed by the display control unit 26. The display control unit 26 may manage the type and acquisition state of material data, and may generate display data for displaying the state of material data including these items in an identifiable manner. The type and acquisition state of material data are acquired from the material data acquisition unit 25. In the example, as can be seen from FIG. 8 showing states of acquisition, the display control unit 26 manages the following five states.

(i) State STS1: In the state STS1, the material data is not present in the HDD 5, and only the metadata is stored in the HDD 5.

(ii) State STS2: In the state STS2, the metadata and proxy data are stored in the HDD 5.

(iii) State STS3: In the state STS3, the metadata is stored in the HDD 5, and the proxy data is being acquired.

(iv) State STS4: In the state STS4, the metadata and main data are stored in the HDD 5.

(v) State STS5: In the state STS5, the metadata is stored in the HDD 5, and the main data is being acquired.

Referring again to FIG. 5 as the enlarged view showing the clip designation window 63, an example of displaying the five states will be described. In each icon, a state of material data of the clip and metadata are displayed. A mark "x" in the icon IC1 denotes the state STS1, showing that the "material data of the clip name "Clip33" has not been acquired". The white letter mark "P" in the icon IC2 denotes the state STS2, showing that the "proxy data" of the clip name "Clip37" is being acquired". The black letter mark "P" in the icon IC3 denotes the state STS3, showing that the "proxy data of the clip name "Clip36" has been acquired". The white letter mark "H" in the icon IC4 denotes the state STS4, showing that the main data of the clip name "Clip38" is being acquired". In the icon IC5, no mark is displayed unlike the case of the other states, and only an image is displayed in the window. This state denotes the state STS5, showing that the "main data of the clip name "Clip06" has been acquired".

The display control unit 26 may monitor the amount of all the material data and the amount of the acquired data, and may generate display data for displaying the percentage of the acquired data. In the example, the percentage of the acquired data is shown in each icon IC2, IC4.

The state of material data may be shown in the time line display window 61 in FIG. 6 and the metadata window 42 in FIG. 4, in addition to the clip designation window 63.

As described above, by displaying the state of material data at the time of obtaining material data on the background during editing operation using metadata, the editor can keep track of the state of operation on the background in real time.

<<Process Carried Out by Editing Apparatus>>

Next, with reference to FIGS. 9 and 10, a process carried out by the editing apparatus 100 will be described.

(1) Main Routine

Figure 9:
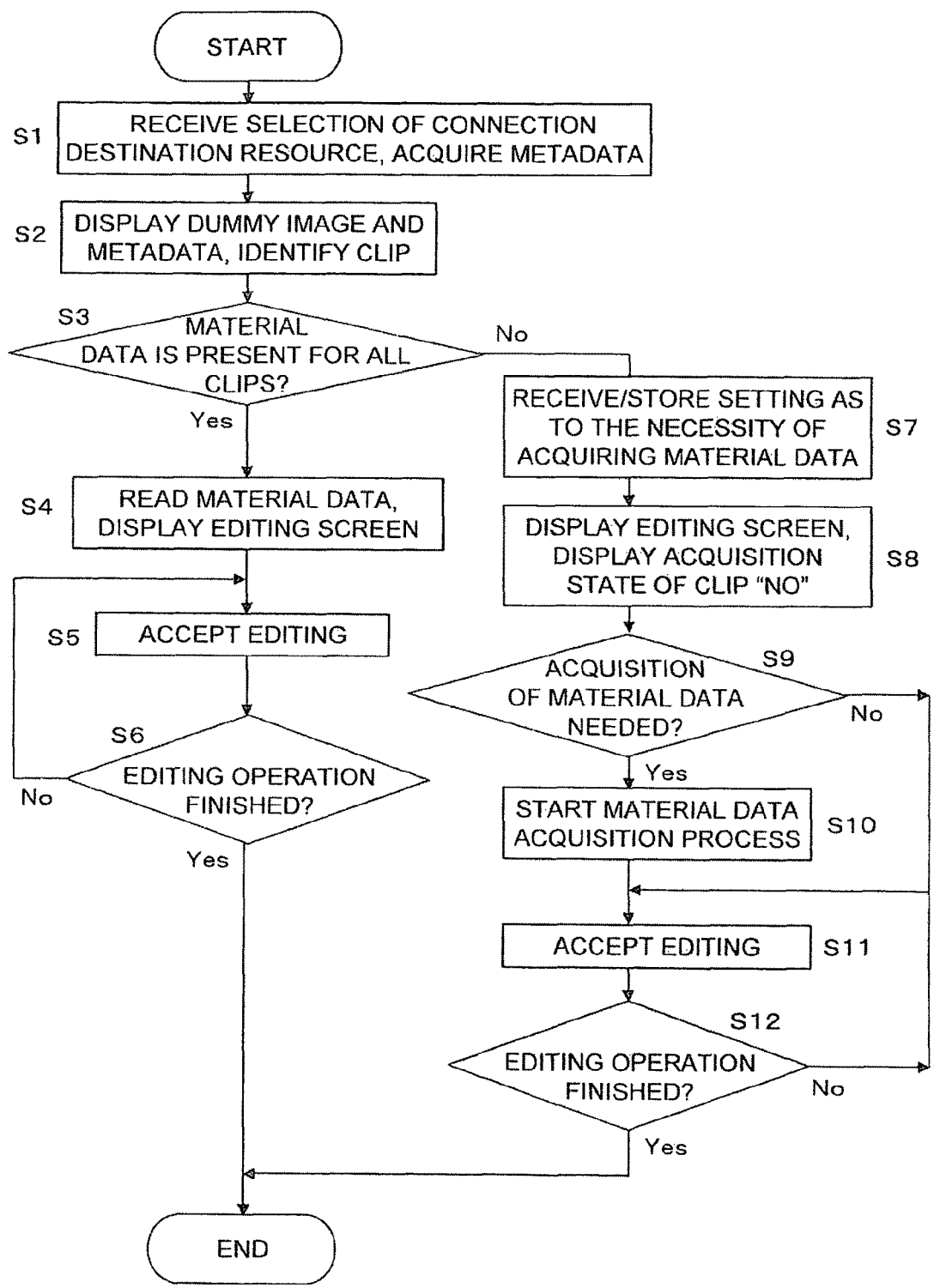
FIG. 9 is a flow chart showing an example of the flow of a main routine carried out by the editing apparatus in FIG. 1.

FIG. 9 is a flow chart showing an example of the flow of the main routine carried out by the CPU 2 of the editing apparatus 100. When transferring data to the editing storage means is instructed on the predetermined menu screen (not shown), the following process is started.

Step S1: The CPU displays the designation screen illustrated in FIG. 4, and accepts selection of the connection designation resource. That is, the CPU 2 receives designation as to from which source metadata is read. Then, the CPU 2 reads metadata from the designated connection destination resource, and writes the read metadata in the HDD 5.

Steps S2 to S3: The CPU 2 displays the metadata written in the HDD 5 and a predetermined dummy image to identify clips of the metadata (S2). Further, the CPU 2 determines whether material data is present in the HDD 5 or not for every clip (S3). If material data is present for every clip, the routine goes to step S4. If material data is not present for some or all of clips, the routine goes to step S7 as described later.

Step S4: The CPU 2 reads material data of the clip identified in step S2 (S4), and displays the editing screen illustrated in FIG. 6. That is, each clip, metadata and material data are displayed in association with each other. Further, the CPU 2 may display the acquisition state of the material data. In this example, if all the material data is acquired, the acquisition state is shown as "acquired".

Steps S5 to S6: The CPU 2 receives designation of the clip used for editing the content on the editing screen, and updates the editing data (S5). This is repeated until completion of editing operation is instructed (S6), and editing data which associates the clip ID, the material time information and the content time information with each other are generated.

Step S7: In the case where material data is not present for some or all of the clips of material data written in the HDD 5, the CPU 2 receives acquisition settings of material data on the designation screen illustrated in FIG. 4. The clip IDs of clips without any acquisition settings and material data are temporarily stored in the RAM 4.

Step S8: The CPU 2 displays the editing screen illustrated in FIG. 6. At this stage, the CPU 2 displays the mark "x" indicating the state "ST1" as the state of the clip for which only the metadata has been obtained.

Steps S9 to S10: In the case where acquisition of material data is requested (S9), the CPU 2 starts operation of the "material data acquisition process" on the background of the editing screen (S10). Based on the material data acquisition process, material data of the clip is acquired in accordance with the settings determined by the editor. The change in the acquisition settings is displayed on the editing screen. The process will be described later. If acquisition of material data is not required, the routine proceeds to step S11.

Steps S11 to S12: The CPU 2 starts reception of designation and editing of the content on the editing screen (S11), and edits the content until completion of the editing process is instructed (S12).

The above process enables editing operation using metadata. In this manner, the wait time from the start of reading data from a recording medium such as an optical disk to the start of editing operation is reduced, and it becomes possible to immediately start the editing operation.

(2) Acquisition Process of Material Data

Figure 10:
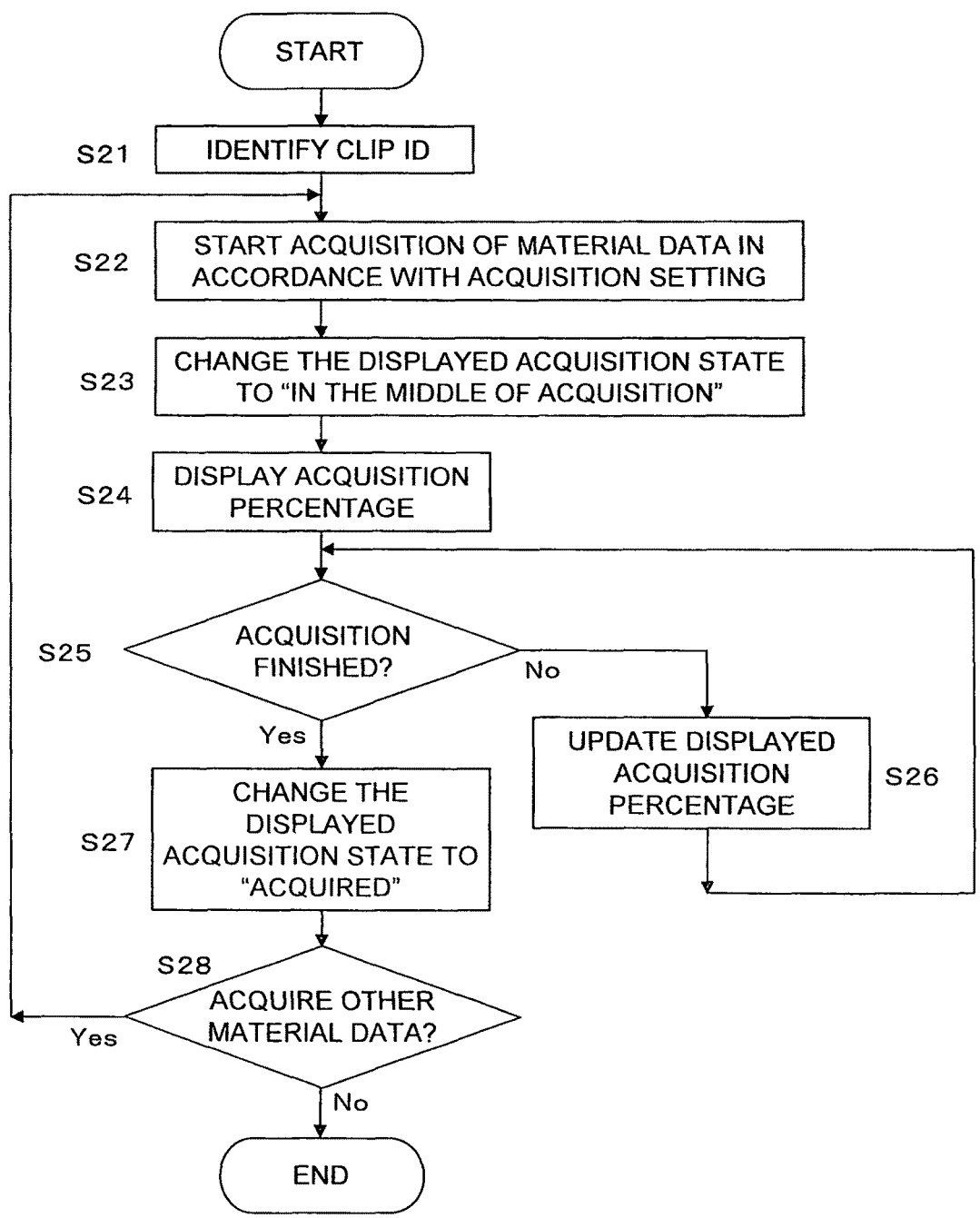
FIG. 10 is a flow chart showing an example of the flow of a material data acquisition process carried out by the editing apparatus in FIG. 1.

FIG. 10 is a flow chart showing an example of the flow of the material data acquisition process. The CPU 2 of the editing apparatus 100 starts the following process after starting the material data acquisition process in step S10 in the main routine.

Step S21: The CPU 2 reads the material clip IDs of clips temporarily stored in the RAM 4 in the main routine.

Step S22: The CPU 2 selects one of the clip IDs read in step S21 to be processed. The CPU 2 searches the optical disk using the clip ID to be processed as a key, and starts to read material data designated in the acquisition settings.

Step S23: The CPU 2 changes the acquisition state of material data of the clip displayed on the editing screen to "in the middle of acquisition". For example, if material data to be acquired is the proxy data, the mark indicating the state "STS3" is displayed, and if the material data to be acquired is the main data, the mark indicating the state "STS5" is displayed. At this time, these marks are displayed in association with the metadata.

Step S24: The CPU 2 displays the acquisition percentage of material data in the middle of acquisition as "0%".

Steps S25 to S26: Until completion of material data (S25), the CPU 2 continues acquisition of material data while updating the display of the acquisition percentage (S26).

Step S27: With respect to material data which has been acquired, the CPU 2 changes the displayed acquisition state to "acquired". For example, if material data to be acquired is the proxy data, the mark indicating the state "STS2" is displayed, and if the material data to be acquired is the main data, the mark indicating the state "STS4" is displayed. At this time, these marks are displayed in association with the metadata.

Step S28: When acquisition of material data for one clip ID is finished, the CPU 2 determines whether there is any other clip for which material data needs to be acquired. If the determination is "YES", the routine proceeds back to step S22 to repeat the process of steps S22 to S27 for material data of other clips. If the determination is "NO", the process is finished.

According to this process, material data of the clip is acquired on the background of editing operation. In this manner, it is possible to start editing operation without waiting completion of acquisition of material data. Further, upon completion of acquisition of material data, editing can be performed by using the available material data, and further improvement in the convenience for the editor is achieved.

Other Embodiments (A) In the case of receiving acquisition settings of material data, the designation reception unit 22 can receive not only the type of material data but also the settings of the capture area. As for the "captured area", the following choices (1) to (3) and combination of these choices can be adopted.

Figure 11:
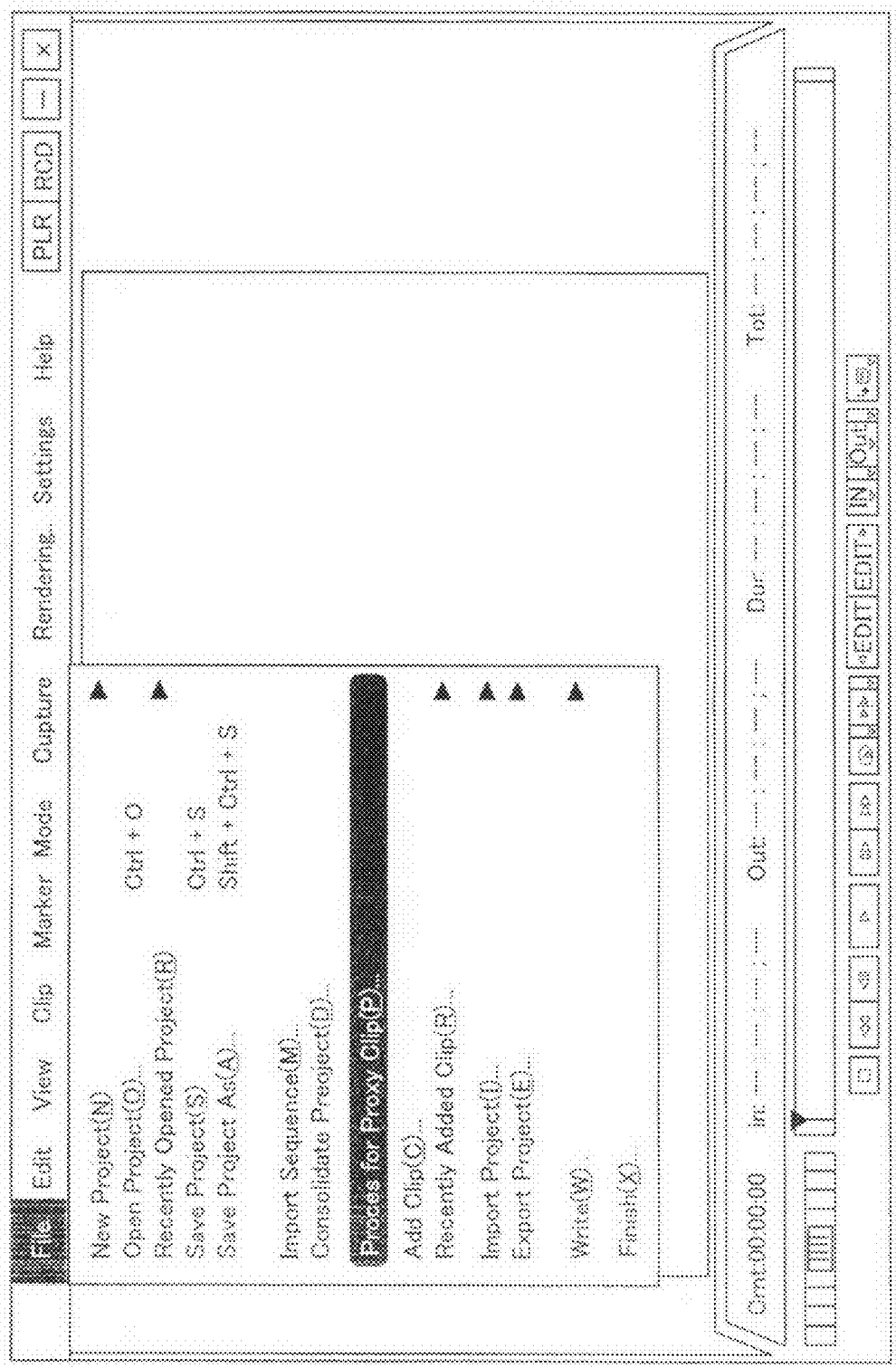
FIG. 11 is a view showing an example of a menu window displayed by the editing apparatus.
Figure 12:
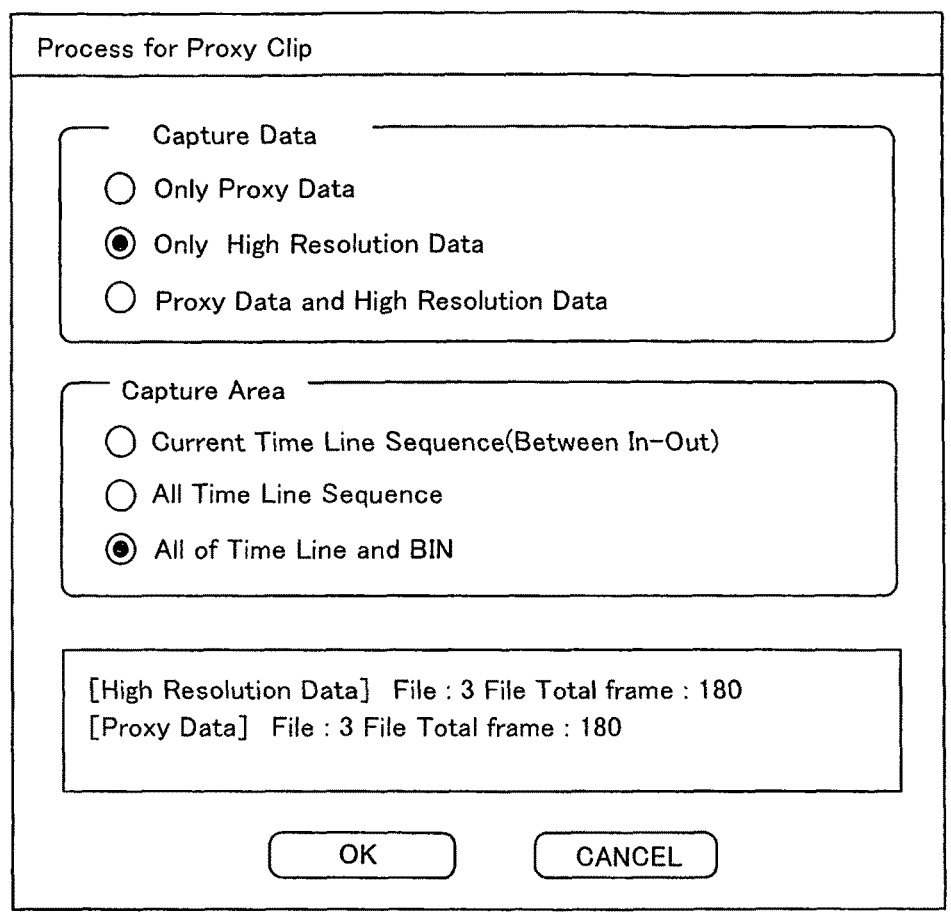
FIG. 12 is a view showing an example of an acquisition setting window opened from the menu screen in FIG. 11.

(1) Material data of clips on the entire time line (2) Material data of clips on the time line, that is subject to the current editing operation (3) Material data of clips shown on the clip designation window FIGS. 11 and 12 show examples of transfer to another acquisition setting window 43 for receiving acquisition settings of material data. When the "process of the proxy clip" is selected in a menu window illustrated in FIG. 11, the "acquisition setting window 43" in FIG. 12 is displayed. In this example, as the type of material data, "only high resolution data" is selected, i.e., acquisition of only the main data is set. Further, as the capture range, "all of the time line and the BIN" is selected. This corresponds to combination of choices (1) and (3). The acquisition settings received on the acquisition setting screen are stored in the ROM 3 as the default settings, and the default settings are used in the subsequent editing operation.

(B) The computer program for allowing a computer to carry out the above described method, and the recording medium readable by the computer and storing the program are within the scope of the present invention. For example, the recording medium readable by the computer includes CD-ROM, MO, DVD, DVD-ROM, DVD-RAM, BD (Blue-Ray Disc) and a semiconductor memory.

The computer program is not limited to those recorded in the recording medium, and may be transmitted through a telecommunication line, a wireless or wired communication line, or a network such as the Internet.

INDUSTRIAL APPLICABILITY

The present invention is applicable to an editing apparatus for editing video data and audio data.

The invention claimed is:

1. An editing apparatus comprising:
a metadata acquisition unit for acquiring metadata, using a drive controlled by a computer processing unit (CPU) to read the metadata from a recording medium and store in an editing storage means, which metadata including time length information of material data and material identifiers recorded by a shooter for identifying useable material data, wherein the metadata is annex information for managing material data, and further wherein the metadata includes a clip identifier and is presented to an editor in text form;
a material data acquisition unit for acquiring the material data from the recording medium and writing the acquired material data in the editing storage means;
a determination unit to determine whether the material data is stored in the editing storage means or not;
a user interface unit for selecting at least part of the material data by using the metadata for generating display data including the time length information and material identifiers provided in the metadata and for receiving designation of material data forming content based on the display data, wherein the user interface generates a display data associated with a predetermined dummy image with the material identifier and the time length information; and
an editing unit for generating editing data used for editing content prior to initial broadcast, according to the selection, wherein the editing storage means unit is a hard disk drive (HDD), and the material data is edited using only the material data identifiers and the time length information.

2. The editing apparatus according to claim 1, wherein the metadata acquisition unit acquires the metadata including the material identifiers for identifying the material data and time length information indicating the duration of the material data from the recording medium, and writes the metadata in an editing storage means,
wherein the user interface unit comprising:
a display control unit for generating display data that further associates a predetermined dummy image of the material data used to display the material identifiers and the time length information included in the metadata acquired by the metadata acquisition unit, wherein the material identifiers and the time length information are associated with each other; and
a designation reception unit for receiving the designation of material data forming content based on the display data, and
wherein the editing unit generates the editing data based on the designation.

3. The editing apparatus according to claim 2, further comprising a determination unit for determining whether the material data is stored in the editing storage means or not,
wherein the display control unit generates display data for further associating a predetermined dummy image with the material identifier and the time length information in response to the determination result by the determination unit.

4. The editing apparatus according to claim 2, wherein the designation reception unit further receives a setting as to whether the material data is acquired from the recording medium, and wherein the display control unit generates display data for further associating the material data acquired by the material acquisition unit with the metadata.

5. The editing apparatus according to claim 4, wherein the designation reception unit further receives a setting as to the type of material data to be acquired.

6. The editing apparatus according to claim 4, wherein the display control unit generates display data for further associating a state of the material data acquired by, or being acquired by the material acquisition unit with the metadata.

7. The editing apparatus according to claim 1, wherein the metadata acquisition unit acquires the metadata including a material identifier for identifying the material data and time length information indicating the duration of the material data from the recording medium, and writes the metadata in editing storage means,
wherein the user interface unit generates display data used to display the material identifier and the time length information included in the metadata acquired by the metadata acquisition unit such that the material identifier and the time length information are associated with each other, and receives the selection based on the generated display data, and
the editing unit generates the editing data before the material data is completely acquired from the recording medium.

8. An editing program product, recorded on a non-transitory computer-readable medium, for allowing a computer terminal to carry out:
a metadata acquisition step of acquiring metadata from a recording medium and storing in an editing storage means, which metadata including time length information of material data and material identifiers recorded by a shooter for identifying useable material data, wherein the metadata is annex information for managing material data, and further wherein the metadata includes a clip identifier and is presented to an editor in text form;

a material acquisition step of acquiring the material data from the recording medium and writing the acquired material data in the editing storage means;

a determining step to determine whether the material data is stored in the editing storage means or not;

a user interface step of selecting at least part of the material data by using the metadata for generating display data including the time length information and material identifiers provided in the metadata and for receiving designation of material data forming content based on the display data, wherein the selecting is accomplished by selecting a predetermined dummy image associated with the material identifiers and the time length information provided in the metadata and stored in the editing storage means; and an editing step of generating editing data according to the selection used for editing content prior to initial broadcast, according to the selection, wherein the material data is edited using only the material data identifiers and the time length information.

9. An editing method comprising:

a metadata acquisition step of acquiring metadata from a recording medium and storing in an editing storage means, which metadata including time length information of material data and material identifiers recorded by a shooter for identifying useable material data, wherein the metadata is annex information for managing material data, and further wherein the metadata includes a clip identifier and is presented to an editor in text form;

a material acquisition step of acquiring the material data from the recording medium and writing the acquired material data in the editing storage means;

a determination step of determining whether the material data is stored in the editing storage means or not;

a user interface step of selecting at least part of the material data by using the metadata for generating display data including the time length information and material identifiers provided in the metadata and for receiving designation of material data forming content based on the display data, wherein the user interface generates a display data associated with a predetermined dummy image with the material identifier and the time length information; and an editing step of generating editing data according to the selection used for editing content prior to initial broadcast, according to the selection, wherein the material data is edited using only the material data identifiers and the time length information.

10. An editing apparatus comprising:

a metadata acquisition means for acquiring metadata from a recording medium and storing in an editing storage means, which metadata including time length information of material data and material identifiers recorded by a shooter for identifying useable material data, wherein the metadata is annex information for managing material data, and further wherein the metadata includes a clip identifier and is presented to an editor in text form;

a material acquisition means for acquiring the material data from the recording medium and writing the acquired material data in the editing storage means;

a determination means to determine whether the material data is stored in the editing storage means or not;

a user interface means for selecting at least part of the material data by using the metadata for generating display data including the time length information and material identifiers provided in the metadata and for receiving designation of material data forming content based on the display data, wherein the selecting is accomplished by selecting a predetermined dummy image associated with the material identifier and the time length information; and an editing means for generating editing data used for editing content prior to initial broadcast, according to the selection, wherein the material data is edited using only the material data identifiers and the time length information.

* * * * *